United States Patent
Lee et al.

(10) Patent No.: US 8,040,766 B2
(45) Date of Patent: Oct. 18, 2011

(54) METHOD AND APPARATUS FOR COMPENSATING FOR DEFECT OF STORAGE MEDIUM

(75) Inventors: Dong-hwan Lee, Seoul (KR); Young-jae Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 12/718,478

(22) Filed: Mar. 5, 2010

(65) Prior Publication Data
US 2011/0103204 A1      May 5, 2011

(30) Foreign Application Priority Data
Nov. 3, 2009   (KR) .................. 10-2009-0105498

(51) Int. Cl.
*G11B 7/00* (2006.01)
(52) U.S. Cl. .................. 369/44.32; 369/44.11
(58) Field of Classification Search ............... 369/44.11, 369/44.32
See application file for complete search history.

(56) References Cited

U.S. PATENT DOCUMENTS

| | | | |
|---|---|---|---|
| 5,483,510 A | | 1/1996 | Ogino |
| 6,791,916 B2 * | | 9/2004 | Tateishi et al. ............. 369/44.32 |
| 6,819,638 B1 * | | 11/2004 | Sakamoto et al. ......... 369/44.32 |
| 2003/0103425 A1 * | | 6/2003 | Shidara ...................... 369/44.32 |
| 2005/0174900 A1 * | | 8/2005 | Kim et al. .................. 369/44.32 |
| 2008/0025167 A1 | | 1/2008 | Wu |
| 2008/0232201 A1 | | 9/2008 | Zhou |

FOREIGN PATENT DOCUMENTS

| | | |
|---|---|---|
| JP | 3-130936 A | 6/1991 |
| KR | 2001-0103467 A | 11/2001 |

OTHER PUBLICATIONS

International Search Report and Written Opinion of the International Searching Authority issued on Jun. 23, 2011, in counterpart International Application No. PCT/KR2010/007115 (8 pages, in English).

\* cited by examiner

*Primary Examiner* — Wayne Young
*Assistant Examiner* — Brenda Bernardi
(74) *Attorney, Agent, or Firm* — NSIP Law

(57) ABSTRACT

An apparatus for compensating for a defect of a storage medium of an optical driving includes a memory to store sample values of a servo driving signal during at least one track sampled by a first signal and cycle information about the first signal; a servo driving signal estimator to estimate a servo driving signal during at least one next track using the sample values, the cycle information about the first signal, and cycle information based on a second signal; and a transmitter to transmit the servo driving signal estimated by the servo driving signal estimator to a servo driver of the optical driving device during a defect section of the storage medium; wherein the first signal is synchronized with a radial direction of the storage medium; and the second signal has a frequency higher than the first signal.

18 Claims, 9 Drawing Sheets

FIG. 5A
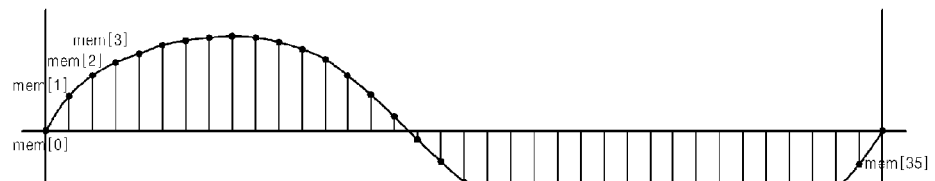
FIG. 5B
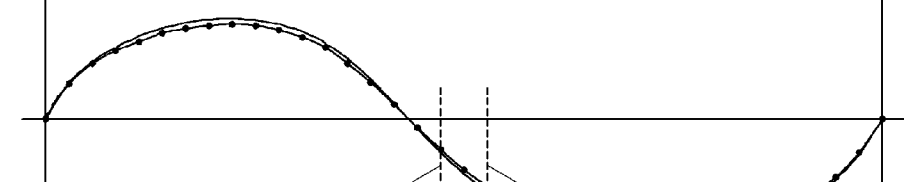
FIG. 5C
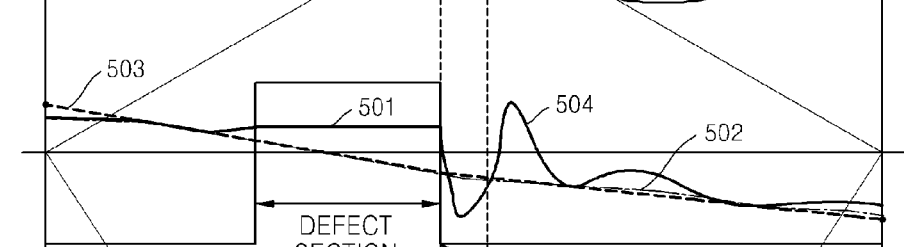
FIG. 5D
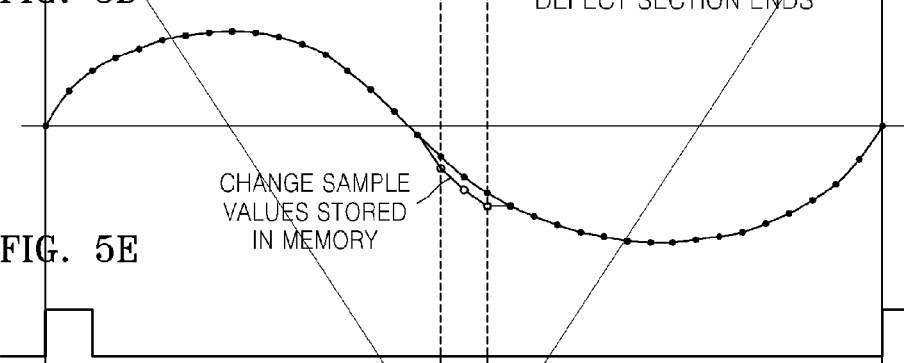
FIG. 5E
FIG. 5F

METHOD AND APPARATUS FOR COMPENSATING FOR DEFECT OF STORAGE MEDIUM

CROSS-REFERENCE TO RELATED APPLICATIONS

This application claims the benefit under 35 USC 119(a) of Korean Patent Application No. 10-2009-0105498 filed on Nov. 3, 2009, in the Korean Intellectual Property Office, the disclosure of which is incorporated herein by reference in its entirety for all purposes.

BACKGROUND OF THE INVENTION

1. Field of the Invention

Aspects of the invention relate to compensating for a defect of a storage medium of an optical driving device, and more particularly to a method and an apparatus for compensating for a defect of the storage medium by controlling a servo driver of the optical driving device during a defect section of the storage medium.

2. Description of the Related Art

A defect easily occurs on a surface of a storage medium such as an optical disc due to a scratch or a fingerprint. Such a defect causes an abnormal signal during a defect section of the optical disc when a signal of the optical disc is reproduced or recorded and thus a servo control operation is not normally performed. In this case, an optical spot is not correctly focused at a desired point of the optical disc.

Therefore, a variety of methods of performing the servo control operation with respect to the optical disc have been proposed in order to correctly focus the optical spot during the defect section of the optical disc.

However, a scratch defect or a black band defect having a size of several mm and a fingerprint defect having a size of several tens of mm may occur between two frequency generator (FG) signals. A defect having different start points and lengths on adjacent tracks may occur. Several defects may occur on a single track. A defect may occur substantially parallel to a radial direction. Thus, various types of defects can occur on a storage medium.

SUMMARY OF THE INVENTION

Aspects of the invention relate to a method and an apparatus for compensating for a servo driving signal and a defect of a storage medium such as an optical disc.

According to an aspect of the invention, an apparatus for compensating for a defect of a storage medium of an optical driving device includes a memory to store sample values of a servo driving signal during at least one track sampled by a first signal and cycle information about the first signal; a servo driving signal estimator to estimate a servo driving signal during at least one next track using the sample values, the cycle information about the first signal, and cycle information based on a second signal; and a transmitter to transmit the servo driving signal estimated by the servo driving signal estimator to a servo driver of the optical driving device during a defect section of the storage medium; wherein the first signal is synchronized with a radial direction of the storage medium; and the second signal has a frequency higher than the first signal.

According to an aspect of the invention, the apparatus further includes a post compensator to monitor a fluctuation of a servo driving signal of a current track or a servo error signal of the current track and compensate the sample values stored in the memory according to a result of the monitoring when the servo driving signal of the current track is transmitted to the servo driver immediately after the defect section ends.

According to an aspect of the invention, the post compensator changes the sample values of a servo driving signal adjacent to a part where the defect section ends if the servo driving signal of the current track or the servo error signal of the current track is beyond a threshold range based on a previously established threshold during a predetermined cycle of the second signal.

According to an aspect of the invention, the post compensator changes the sample values by a predetermined amount or by a predetermined ratio.

According to an aspect of the invention, the servo driving signal estimator estimates the servo driving signal by performing a linear interpolation operation between the sample values using the cycle information about the first signal and the cycle information based on the second signal; and the cycle information about the second signal is a value obtained by counting ones of the second signal generated between successive ones of the first signal.

According to an aspect of the invention, the servo driving signal estimator estimates the servo driving signal by performing the linear interpolation operation according to the following equation:

$$\text{Drive} = mem[N] + \frac{mem[N+1] - mem[N]}{\text{fg\_length}} \times \text{fg\_count}$$

where Drive denotes an estimated servo driving signal, mem[N] denotes an Nth sample value stored in the memory, mem[N+1] denotes an (N+1)th sample value stored in the memory, fg_length denotes the cycle information about the first signal and is cycle information between the sample values, and fg_count denotes the value obtained by counting the ones of the second signal generated between the successive ones of the first signal.

According to an aspect of the invention, if the value obtained by counting the ones of the second signal is greater than the cycle information about the first signal stored in the memory, a maximum value obtained by counting the ones of the second signal is limited to the cycle information about the first signal.

According to an aspect of the invention, the first signal is a frequency generator (FG) signal; and the second signal is a servo frequency signal.

According to an aspect of the invention, the transmitter transmits a servo driving signal of the current track to the servo driver during a section other than the defect section of the storage medium.

According to an aspect of the invention, a method of compensating for a defect of a storage medium of an optical driving device includes storing sample values of a servo driving signal during at least one track sampled by a first signal and cycle information about the first signal in a memory; estimating a servo driving signal during at least one next track using the sample values, the cycle information about the first signal, and cycle information based on a second signal; and transmitting the estimated servo driving signal to a servo driver of the optical driving device during a defect section of the storage medium; wherein the first signal is synchronized with a radial direction of the storage medium; and the second signal has a frequency higher than the first signal.

According to an aspect of the invention, the method further includes, when a servo driving signal of a current track is transmitted to the servo driver immediately after the defect section ends, monitoring a fluctuation of the servo driving signal of the current track or a servo error signal of the current track; and compensating the sample values stored in the memory according to a result of the monitoring.

According to an aspect of the invention, the monitoring includes determining whether the servo driving signal of the current track or the servo error signal of the current track is beyond a threshold range based on a previously established threshold; and if the servo driving signal of the current track or the servo error signal of the current track is beyond the threshold range, changing the sample values of a servo driving signal adjacent to a part where the defect section ends.

According to an aspect of the invention, the compensating includes changing the sample values by a predetermined amount or by a predetermined ratio.

According to an aspect of the invention, the estimating of the servo driving signal includes estimating the servo driving signal by performing a linear interpolation operation between the sample values using the cycle information about the first signal and the cycle information based on the second signal; and wherein the cycle information about the second signal is a value obtained by counting ones of the second signal generated between successive ones of the first signal.

According to an aspect of the invention, the estimating of the servo driving signal includes estimating the servo driving signal by performing the linear interpolation operation according to the following equation:

$$\text{Drive} = mem[N] + \frac{mem[N+1] - mem[N]}{\text{fg\_length}} \times \text{fg\_count}$$

where Drive denotes an estimated servo driving signal, mem[N] denotes an Nth sample value stored in the memory, mem[N+1] denotes an (N+1)th sample value stored in the memory, fg_length denotes the cycle information about the first signal and is cycle information between the sample values, and fg_count denotes the value obtained by counting the ones of the second signal generated between the successive ones of the first signal.

According to an aspect of the invention, if the value obtained by counting the ones of the second signal is greater than the cycle information about the first signal stored in the memory, a maximum value obtained by counting the ones of the second signal is limited to the cycle information about the first signal.

According to an aspect of the invention, the first signal is a frequency generator (FG) signal, and the second signal is a servo frequency signal.

According to an aspect of the invention, the method further includes transmitting a servo driving signal of a current track to the servo driver during a section other than the defect section of the storage medium.

According to an aspect of the invention, a computer-readable recording medium has stored thereon computer-readable code for controlling a processor to perform a method of compensating for a defect of a storage medium of an optical driving device.

Additional and/or other aspects of the invention will be set forth in part in the description that follows and, in part, will be obvious from the description, or may be learned by practice of the invention.

BRIEF DESCRIPTION OF THE DRAWINGS

The above and other aspects of the invention will become apparent and more readily appreciated from the following description of embodiments of the invention, taken in conjunction with the accompanying drawings, of which:

FIGS. 5A through 5F are timing diagrams of operations of the elements of the apparatus for compensating for the defect of the storage medium of FIG. 4;

DETAILED DESCRIPTION OF THE INVENTION

Figure 1:
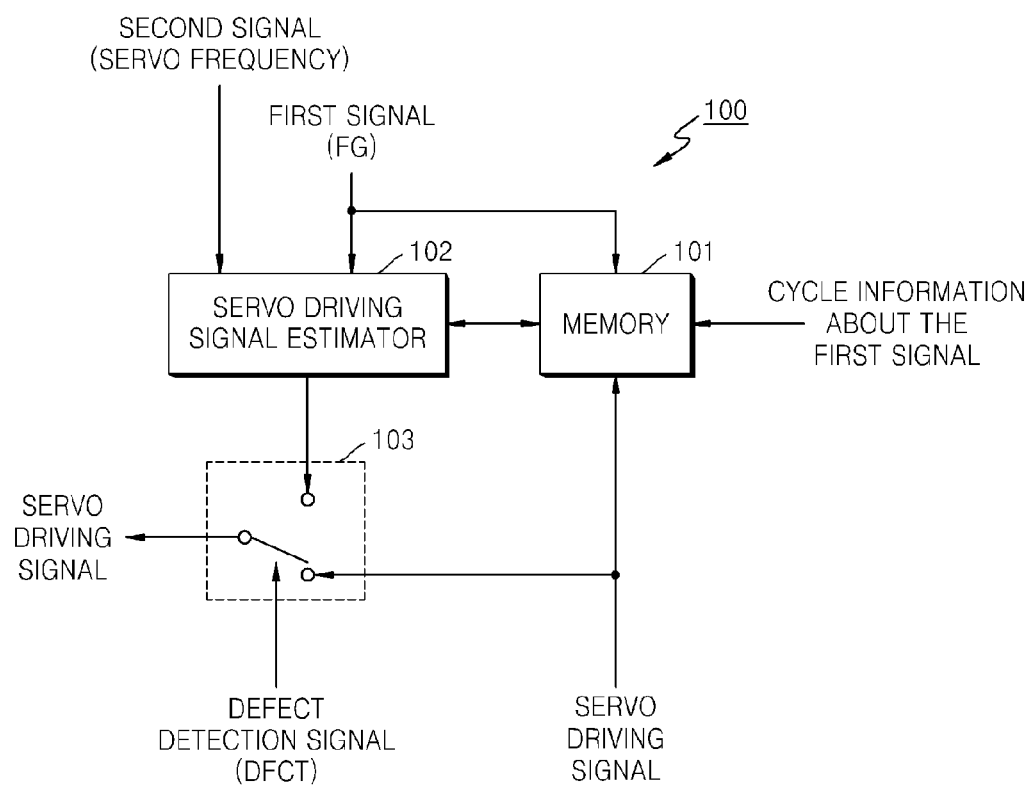
FIG. 1 is a diagram of an apparatus for compensating for a defect of a storage medium according to an aspect of the invention.

Reference will now be made in detail to embodiments of the invention, examples of which are show in the accompanying drawings, wherein like reference numerals refer to like elements throughout. The embodiments are described below in order to explain the invention by referring to the figures.

FIG. 1 is a diagram of an apparatus 100 for compensating for a defect of a storage medium according to an aspect of the invention. Referring to FIG. 1, the apparatus 100 for compensating for the defect of the storage medium may be included in a device for driving the storage medium, such as an optical driving device, and is used by compensating for a servo driving signal of the optical driving device. The servo driving signal of the optical driving device may include, for example, a focus of drive (FOD) signal and a track drive (TRD) signal. An optical disc may be used as the storage medium.

The apparatus 100 includes a memory 101, a servo driving signal estimator 102, and a transmitter 103.

The memory 101 stores sample values of the servo driving signal during one track sampled by a first signal. The servo driving signal during one track may be a servo driving signal of a current track. The first signal may be a signal synchronized in the radial direction of the storage medium, i.e., a signal synchronized with a revolution or a rotation of the storage medium. With respect to the optical driving device, for example, a frequency generator (FG) signal may be used as the first signal. However, the first signal may be a signal having a frequency higher than the FG signal obtained by dividing the FG signal. When the storage medium is the optical disc, and the signal synchronized with the radial direction of the storage medium is used as the first signal, it is possible to compensate for a distortion during the defect section of the storage medium using the sample values of the servo driving signal stored in the memory 101.

The sample values stored in the memory 101 may be a servo driving signal sampled at a rising edge of the first signal. That is, the servo driving signal sampled at the rising edge of the first signal is stored in the memory 101. However, in order to increase a resolution, the servo driving signal sampled at the rising edge of the first signal and a servo driving signal sampled at a falling edge of the first signal may be stored in the memory 101. The sample values stored in the memory 101 may be used as a servo driving signal during a defect section of a next track or during defect sections of a plurality of next tracks.

The sample values of the servo driving signal of one track stored in the memory 101 may be defined as sample values of a servo driving signal of one revolution. The sample values of the servo driving signal of one revolution are stored in the memory 101 since servo driving signals have similar patterns in adjacent tracks. However, the sample values of the servo driving signal of one track stored in the memory 101 may be the sample values of the servo driving signal of one revolution (or the current track) as described above, or may be a combination of sample values of servo driving signals of several revolutions (or several tracks).

When the combination of sample values of servo driving signals of several revolutions are stored in the memory 101, the apparatus 100 may further include an element for calculating an average value. For example, when sample values of servo driving signals of several revolutions are combined by calculating an average thereof, the apparatus 100 may further include an element for calculating an average value of sample values of servo driving signals of several revolutions and storing the average value in the memory 101.

Figure 2:
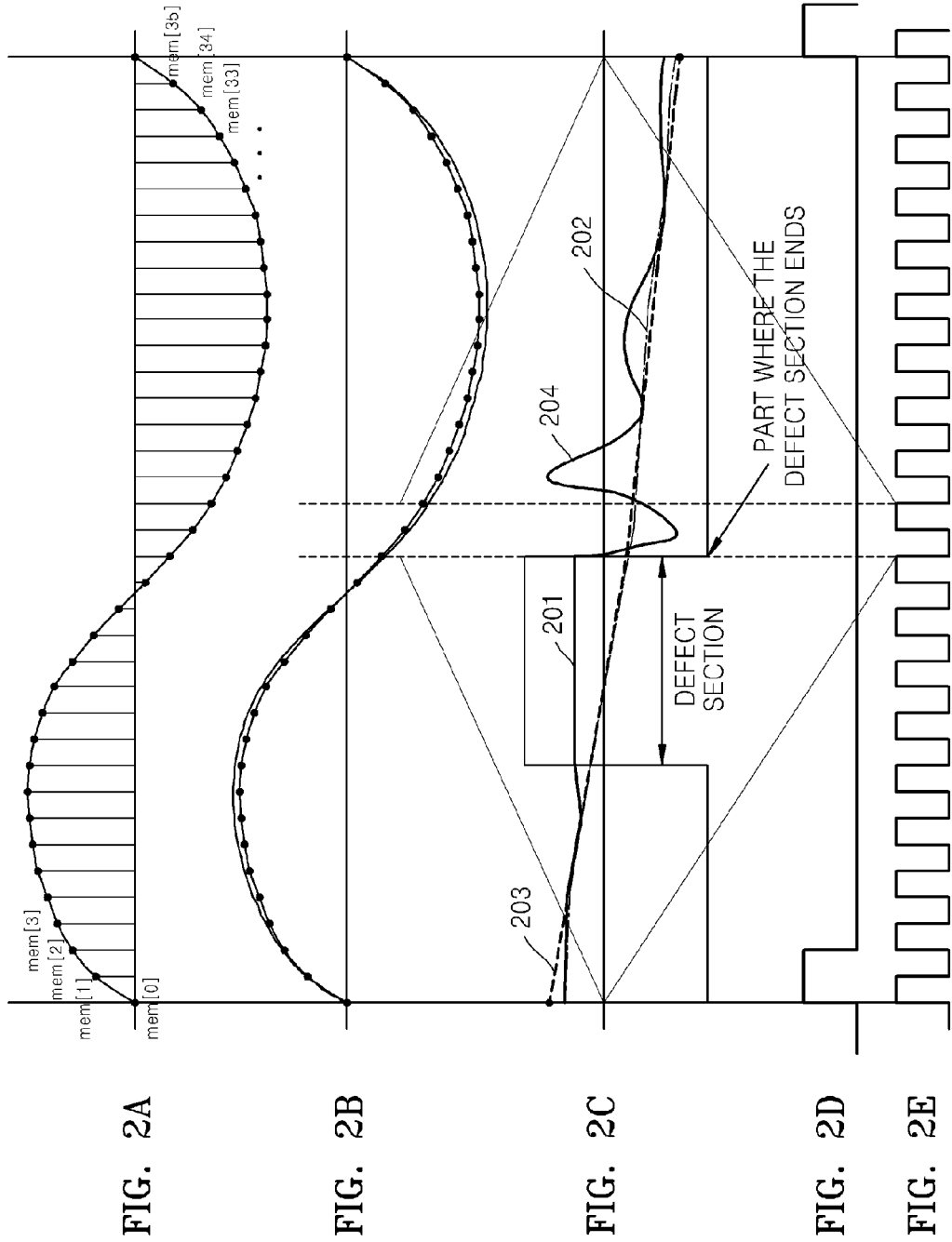
FIGS. 2A through 2E are timing diagrams of operations of the elements of the apparatus for compensating for the defect of the storage medium of FIG. 1.

FIGS. 2A through 2E are timing diagrams of operations of the elements of the apparatus 100 of FIG. 1. Referring to FIG. 2A, sample values mem[0], mem[1], mem[2], mem[3], . . . , mem[35] of a servo driving signal are stored in the memory 101. Referring to FIGS. 2D and 2E that are timing diagrams of a revolution signal and an FG signal, respectively, the sample values mem[0], mem[1], mem[2], meme[3], . . . , mem[35] are values sampled at the rising edge and the falling edge of the FG signal of one revolution. Therefore, 36 sample values are stored in the memory 101 during one revolution as shown in FIG. 2A. However, the number of sample values stored in the memory 101 is not limited thereto. For example, when a signal having a frequency higher than the FG signal is used, the number of sample values stored in the memory 101 may be greater than 36.

The memory 101 stores cycle information about the first signal. The cycle information about the first signal is input from the outside with reference to FIG. 1. However, the apparatus 100 may further include a unit for calculating the cycle information about the first signal. The unit for calculating the cycle information about the first signal may store a value obtained by counting the length of one revolution, divide the stored value by the number of samples stored in the memory 101 during one revolution, and output the divided value to the memory 101 as the cycle information about the first signal. The cycle information about the first signal may be defined as a length, i.e., a time, fg_length between the samples stored in the memory 101. When the first signal is an FG signal, the cycle information about the first signal is cycle information about the FG signal.

When the apparatus 100 is applied to an optical driving device, the memory 101 may be a revolution buffer. The memory 101 may use a random access memory or a flash memory such as a NAND memory or a synchronous memory.

The memory 101 may be implemented as a processor and may include a unit (not shown) for generating a combination of sample values of servo driving signals of several revolutions (or several tracks) and the unit (not shown) for calculating the cycle information about the first signal.

The servo driving signal estimator 102 estimates a servo driving signal during a next track or during a plurality of next tracks by performing a linear interpolation operation between the sample values stored in the memory 101 in synchronization with the first signal. That is, the servo driving signal estimator 102 performs the linear interpolation operation between the sample values stored in the memory 101 and estimates the servo driving signal using cycle information based on a second signal, the sample values stored in the memory 101, and the cycle information about the first signal. The second signal may have a frequency higher than the first signal and, when the apparatus 100 for compensating for the defect of the storage medium is applied to the optical driving device, have a servo frequency. The cycle information based on the second signal is a value obtained by counting the second signals generated between the first signals.

The servo driving signal estimator 102 may perform the linear interpolation operation according to the following Equation (1):

$$\text{Drive} = mem[N] + \frac{mem[N+1] - mem[N]}{\text{fg\_length}} \times \text{fg\_count} \quad (1)$$

In Equation (1) above, the linear interpolation operation is performed between an Nth sample value and an (N+1)th sample value stored in the memory 101. Drive denotes an estimated servo driving signal, mem[N] denotes the Nth sample value stored in the memory 101, mem[N+1] denotes the (N+1)th sample value stored in the memory 101, fg_length denotes the cycle information about the first signal and is cycle information between the sample values, and fg_count denotes the value obtained by counting the second signals generated between the first signals and is the cycle information based on the second signal. When the value obtained by counting the second signals (or the cycle information based on the second signal) is greater than the cycle information about the first signal stored in the memory 101, the maximum value obtained by counting the second signals is limited to the cycle information about the first signal.

Figure 3:
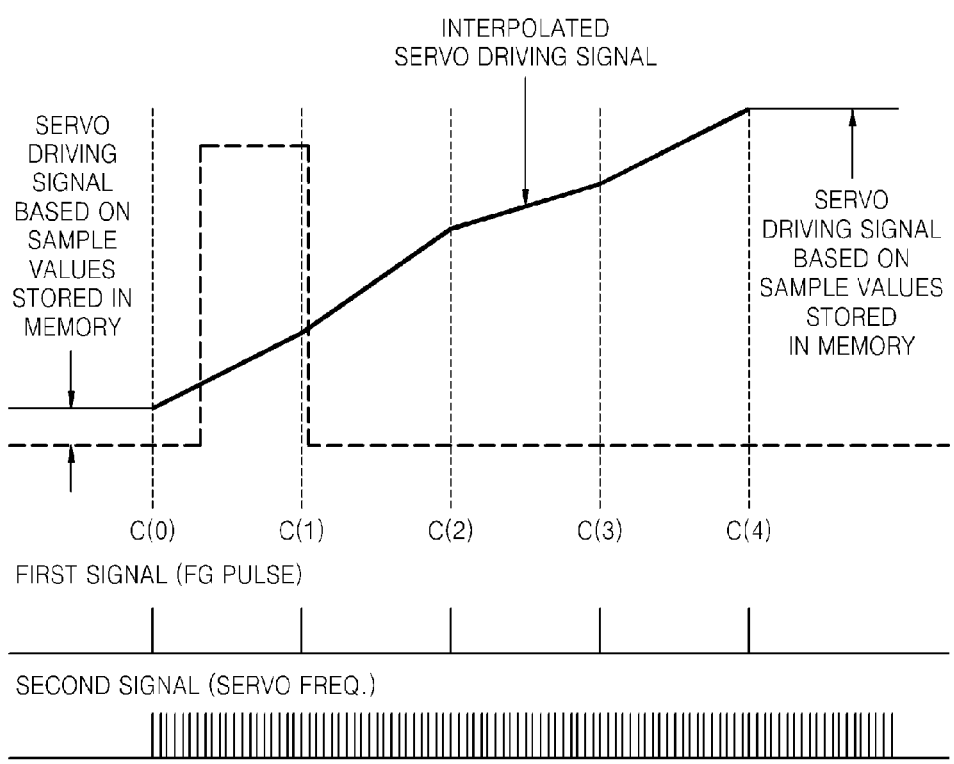
FIG. 3 is a diagram of the relationship between a defect detection signal and a servo driving signal based on sample values stored in a memory and a servo driving signal estimated by performing a linear interpolation operation between the sample values.

When the second signal is used to perform the linear interpolation operation between the sample values as described above, the estimated servo driving signal may softly connect the sample values as shown in FIG. 3, which is a diagram of the relationship between a defect detection signal DFCT and a servo driving signal based on sample values stored in a memory and a servo driving signal estimated by performing the linear interpolation operation between the sample values. Referring to FIG. 3, C(0), C(1), C(2), C(3), and C(4) are sample values stored in the memory 101, and a defect occurs between the sample values C(0) and C(1). When a servo driving signal estimated by performing the linear interpolation operation between the sample values C(0) and C(1) is used, an error is reduced at a part where a defect section ends. The solid line without dots shown in FIG. 2B indicates the servo driving signal estimated by performing the linear interpolation operation between the sample values.

If the defect detection signal DFCT indicates the defect section, the transmitter 103 selects the estimated servo driving signal output from the servo driving signal estimator 102 and outputs the selected servo driving signal as the servo driving signal. On the other hand, if the defect detection signal DFCT does not indicate the defect section, the transmitter 103 selects a servo driving signal of a current track and outputs the selected servo driving signal. The servo driving signal output from the transmitter 103 is transmitted to a servo driver (not shown). When the apparatus 100 is applied to an optical driving device, the servo driver may be, for example, a focus driver or a tracking driver. If the defect detection signal DFCT indicates the defect section, the defect section is a defect section of a storage medium. If the defect detection signal DFCT does not indicate the defect section, the defect section is a section other than the defect section of the storage medium.

When a defect occurs on the storage medium as shown in FIG. 2C, the defect detection signal DFCT is a digital signal having a variable value and is detected from a signal generated by driving the storage medium. The signal generated by driving the storage medium may be a signal output from a pickup unit when the apparatus 100 is applied to the optical driving device. Referring to FIG. 2C which shows an enlarged defect section, if a servo driving signal 201 of a current track maintains a uniform value during the defect section as shown in FIG. 2C, a servo driving signal 204 greatly fluctuates at a part where the defect section ends as shown in FIG. 2C, making a servo control unstable.

However, when an estimated servo driving signal 203 is selected as the servo driving signal during the defect section as shown in FIG. 2C, a servo driving signal 202 does not fluctuate at the part where the defect section ends as shown in FIG. 2C. If the servo driving signal estimated by performing the linear interpolation operation is output during the defect section, a servo driving signal output at the part where the defect section ends (a falling edge of the defect detection signal DFCT) does not greatly change.

As described above, a servo driving signal of a current track or a plurality of tracks is used to estimate a servo driving signal of a next track or a plurality of next tracks, and the estimated servo driving signal is used as a servo driving signal during a defect section of a storage medium, thereby preventing the servo control from being unstable due to an erroneous servo driving signal during the defect section, Further, when a servo driving signal is estimated, a signal having a frequency higher than a signal used to sample the servo driving signal is used to perform a linear interpolation operation between sample values, thereby preventing the servo driving signal from being in a transient state. The linear interpolation operation is performed between the sample values without information about a defect section, thereby estimating a servo driving signal at a current point in real time and solving instability of the servo driving signal during a first defect section.

Figure 4:
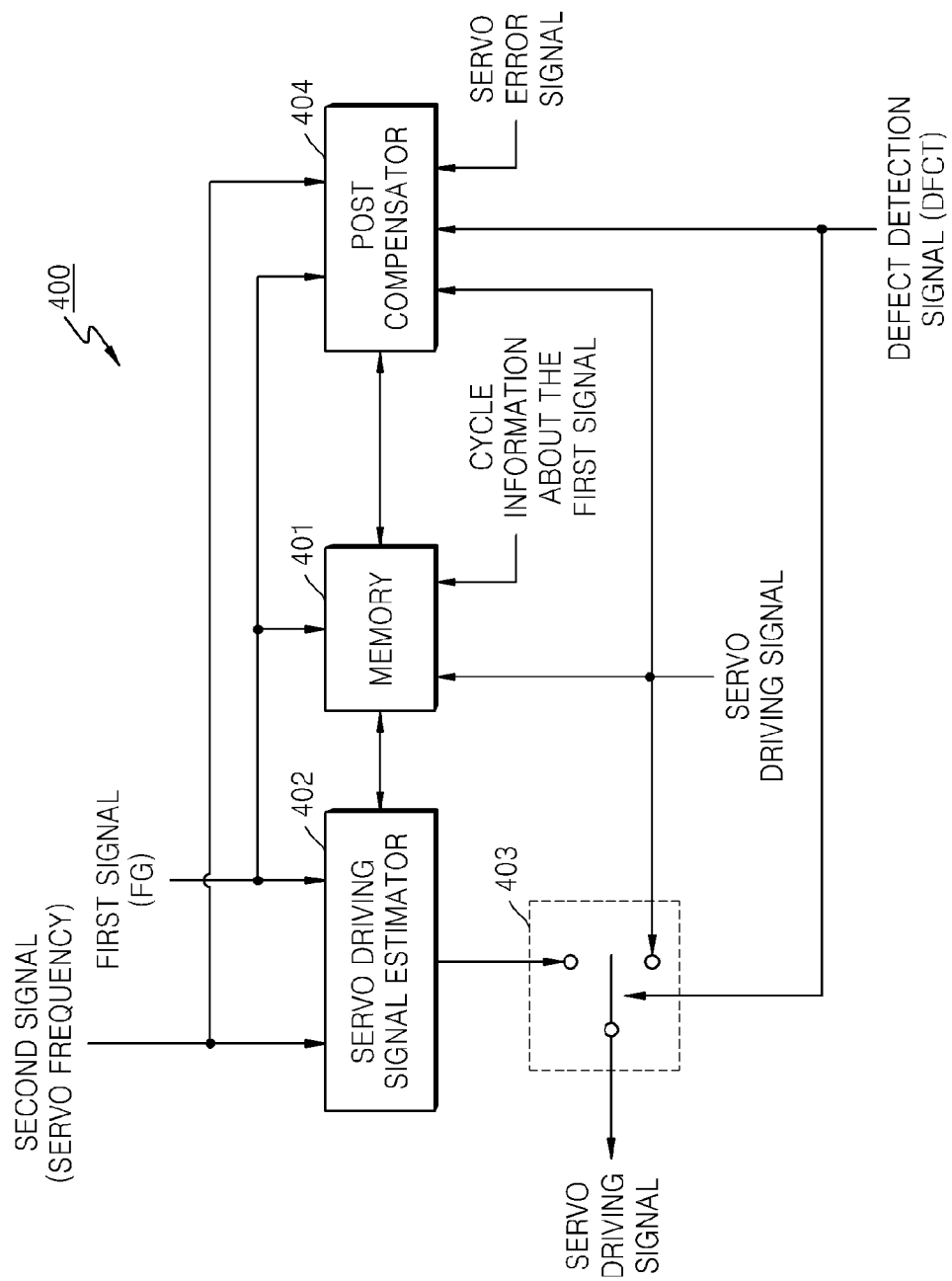
FIG. 4 is a diagram of an apparatus for compensating for a defect of a storage medium according to an aspect of the invention.

FIG. 4 is a diagram of an apparatus 400 for compensating for a defect of a storage medium according to an aspect of the invention. Referring to FIG. 4, the apparatus 400 further includes a post compensator 404 as compared to the apparatus 100 for compensating for the defect of the storage medium described with reference to FIG. 1. Thus, the construction and operation of a memory 401, a servo driving signal estimator 402, and a transmitter 403 shown in FIG. 4 are the same as those of the memory 101, the servo driving signal estimator 102, and the transmitter 103, respectively, shown in FIG. 1, and thus the descriptions thereof will not be repeated here.

The post compensator 404 is used to supplement a reduction in the resolution according to the sampling of a servo driving signal based on a first signal. That is, when a servo driving signal of a current track is transmitted to a servo driver immediately after a defect section of the storage medium ends, the post compensator 404 monitors a fluctuation of the servo driving signal or a servo error signal and compensates sample values stored in the memory 401 to reduce the fluctuation of the servo driving signal or the servo error signal.

In this connection, when the servo driving signal of the current track is transmitted to the servo driver immediately after the defect section of the storage medium ends, the post compensator 404 compares a previously established threshold with the servo driving signal or the servo error signal. It may be previously established whether the threshold is compared to the servo driving signal or the servo error signal according to an operational environment. As a result, if the servo driving signal or the servo error signal is beyond a threshold range based on the previously established threshold, the post compensator 404 compensates the sample values stored in the memory 401 adjacent to a part where the defect section ends to reduce the fluctuation of the servo driving signal or the servo error signal.

That is, if it is determined that the servo driving signal of the current track or the servo error signal of the current track is beyond the threshold range during a predetermined cycle of a second signal, sample values of servo driving signals adjacent to the part where the defect section ends are changed. The sample values are changed by a predetermined amount or by a predetermined ratio or percentage. The sample values are reduced by a predetermined amount or by a predetermined ratio or percentage as shown in FIG. 5D according to a fluctuation of the servo driving signal beyond the threshold range as described below, thereby reducing the fluctuation of the servo driving signal at a part where a defect section ends in a next track.

FIGS. 5A through 5F are timing diagrams of operations of the elements of the apparatus 400 for compensating for the defect of the storage medium of FIG. 4. Referring to FIGS. 5A through 5F, 36 sample values are stored in the memory 401 using rising edges and falling edges of 18 FG signals during one revolution as shown in FIG. 5A.

Referring to FIGS. 5A through 5F, a sample value represents a servo driving signal in a radial direction of about 10 degrees, thereby compensating for a distortion when a defect ends. However, since the sampling intervals are not very fine, an undesired error may occur. Also, if a signal having a large noise component is sampled, the error increases as a side effect, which makes a servo control unstable. The servo driving signal may have different patterns due to the disc characteristics or a defect pattern in an adjacent track, which causes an error and makes the servo control unstable. Thus, it is necessary to compensate for a defect section of a next track by monitoring a servo error signal or a servo driving signal immediately after a defect section ends and compensating sample values adjacent to a part where the defect section ends.

Referring to FIG. 5C, after the defect section ends, a servo driving signal based on a servo error signal of a current track is transmitted to a servo driver. In this regard, a servo driving signal 504 greatly fluctuates due to an error that is not compensated for during a defect section. The post compensator 404 is used to reduce the fluctuation of the servo driving signal 504.

Figure 6B:
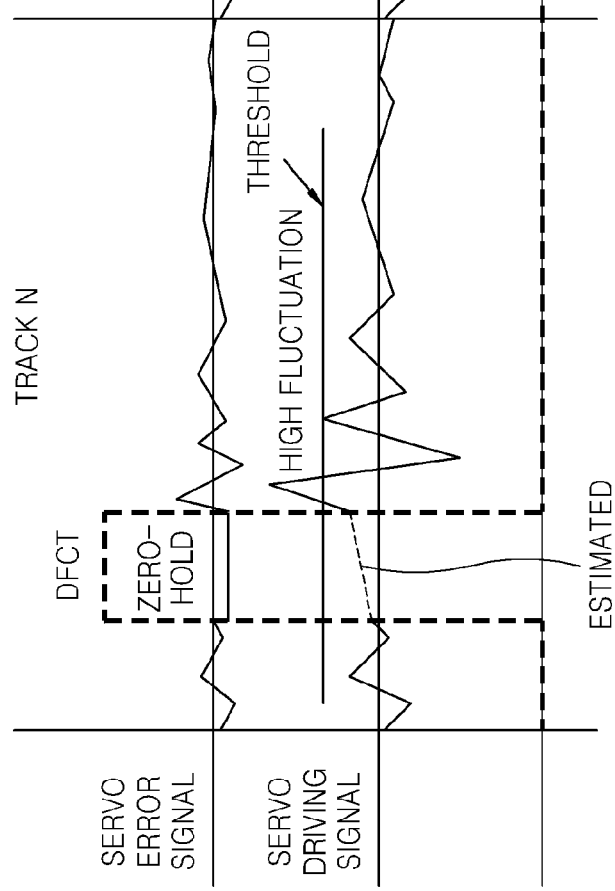
FIGS. 6A and 6B are waveform diagrams of a servo error signal and a servo driving signal before and after a post-compensation operation is performed.
Figure 6A:
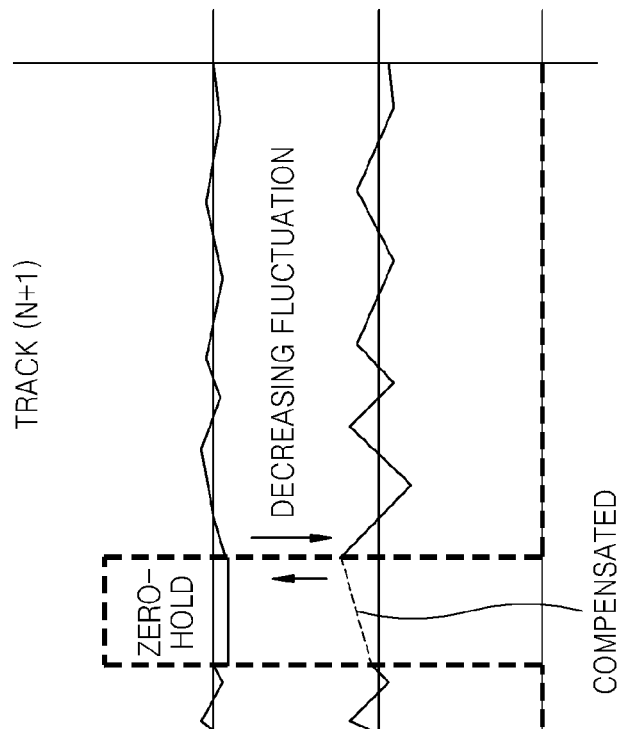

FIGS. 6A and 6B are waveform diagrams of a servo error signal and a servo driving signal before and after a post-compensation operation is performed. Referring to FIG. 6A, the sample values are stored in the memory 401 and the post compensator 404 does not perform the post-compensation operation with respect to the servo error signal and the servo driving signal. Referring to FIG. 6B, the post compensator 404 performs the post-compensation operation with respect to the servo error signal and the servo driving signal.

Referring to FIG. 6A, the servo error signal is zero-held and the servo driving signal is controlled using an estimated servo driving signal during a defect section. Although a servo control operation is performed using the estimated servo driving signal, an error occurs in the servo error signal after the defect section ends due to a limited resolution, which causes a great fluctuation of the servo driving signal. The post compensator 404 determines whether the fluctuation of the servo driving signal is beyond a threshold range based on a threshold and compensates the sample values of the servo driving signal stored in the memory 401 by subtracting or adding a predetermined amount or a calculated amount. Since the fluctuation of the servo driving signal is beyond the threshold range based on the threshold, the post compensator 404 compensates the sample values by subtracting or adding the predetermined amount or the calculated amount.

Referring to FIG. 6B, if the sample values are compensated, a servo driving signal estimated by using a post-compensated value is used during the defect section in a next track N+1. Thus, since an effect of the fluctuation of the servo driving signal is previously reflected in the next track N+1, an error of the servo error signal is reduced compared to a previous track after the defect section ends, thereby reducing the fluctuation of the servo driving signal. When the servo control is not stabilized by using the estimated servo driving signal, the post compensator 404 finely compensates the servo driving signal, thereby performing more stably the servo control operation when a defect occurs during a section similar to the defect section in the next track N+1.

Figure 7:
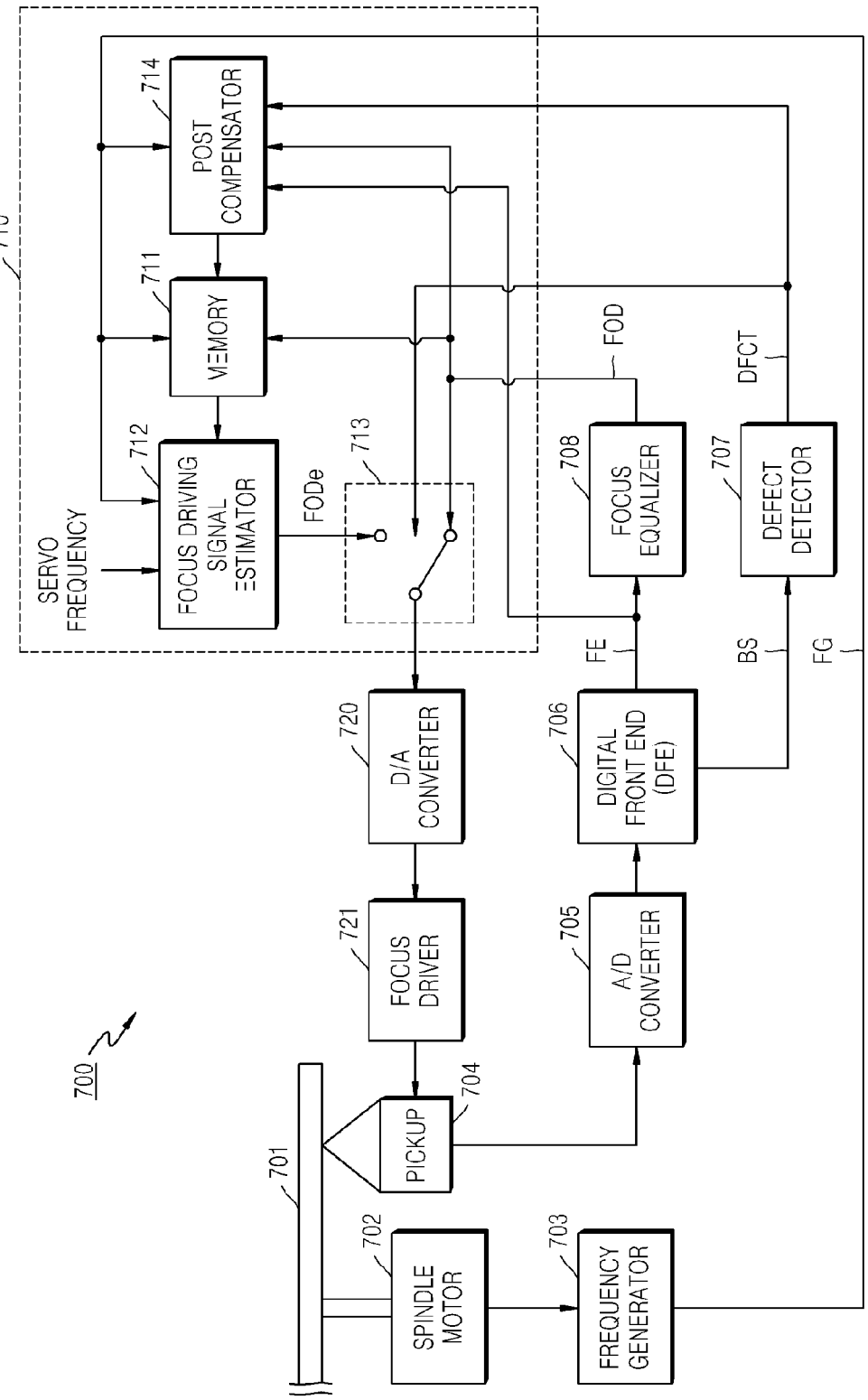
FIG. 7 is a diagram of an optical driving apparatus including an apparatus for compensating for a defect of a storage medium according to an aspect of the invention.

FIG. 7 is a diagram of an optical driving device 700 including an apparatus 710 for compensating for a defect of a storage medium according to an aspect of the invention. Although a focus control operation is shown in FIG. 7, an optical driving device can include an apparatus similar to the optical driving device 700 for a tracking control operation.

The optical disc 700 includes a spindle motor 702 for rotating a disc 701, a frequency generator 703 for outputting an FG signal (or an FG pulse) in synchronization with the spindle motor 702, a pickup 704 for reading information from the disc 701 and generating an error signal, an analog/digital (A/D) converter 705 for converting the error signal received from the pickup 704 into a digital signal, a digital front end (DFE) 706 for generating a control signal (a focus error (FE) signal and a beam strength (BS) signal) from the digital signal, a defect detector 707 for detecting a defect section from the BS signal, a focus equalizer 708 for receiving the FE signal and generating a FOD signal, the apparatus 710 for compensating for the defect of the storage medium, a D/A converter 720 for converting the FOD signal output from the apparatus 710 into an analog signal, and a focus driver 721 for amplifying the FOD signal transmitted from the D/A converter 720 and outputting the amplified FOD signal to the pickup 704.

The apparatus 710 includes a memory 711, a focus driving signal estimator 712, a transmitter 713, and a post compensator 714. The apparatus 710 is the same as the apparatus 400 shown in FIG. 4. Thus, the construction and operation of the memory 711, the focus driving signal estimator 712, the transmitter 713, and the compensator 714 are the same as those of the memory 401, the servo driving signal estimator 402, the transmitter 403, and the post compensator 404, respectively, shown in FIG. 4, and thus the descriptions thereof will not be repeated here.

Figure 8:
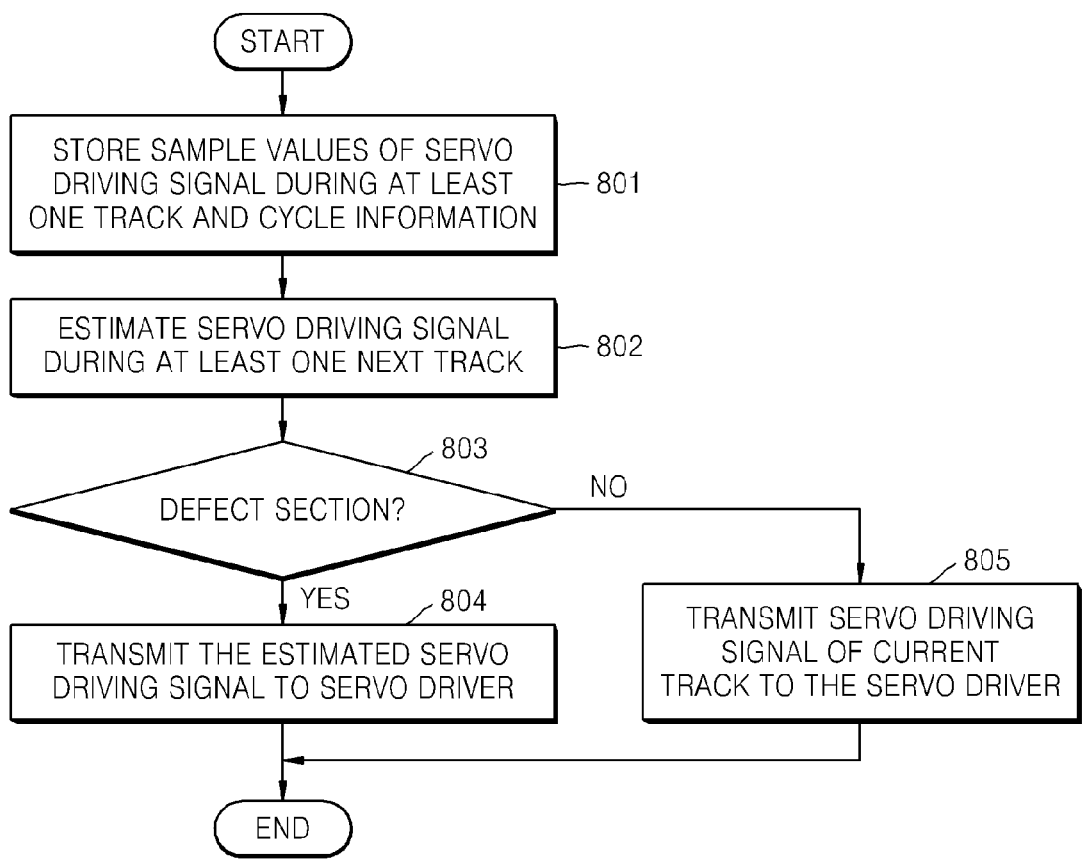
FIG. 8 is a flowchart of a method of compensating for a defect of a storage medium according to an aspect of the invention.

FIG. 8 is a flowchart of a method of compensating for a defect of a storage medium according to an aspect of the invention. The flowchart will now be described with reference to FIG. 1.

Sample values of a servo driving signal during at least one track sampled by a first signal and cycle information about the first signal are stored in the memory 101 (operation 801). The first signal, the cycle information about the first signal, and the first track are the same as described with reference to FIG. 1.

A servo driving signal is estimated during at least one next track using the sample values stored in the memory 101, the cycle information of the first signal, and cycle information based on a second signal in synchronization with the first signal (operation 802). The first signal is synchronized with a radial direction of the storage medium. The second signal has a frequency higher than the signal in synchronization with the radial direction. An optical driving device may use an FG signal as the first signal and a servo frequency signal as the second signal. The servo driving signal may be estimated by performing a linear interpolation operation between the sample values stored in the memory 101 using the cycle information about the first signal and the cycle information based on the second signal as described with reference to FIG. 1. The cycle information based on the second signal is a value obtained by counting the second signals generated between the first signals.

If a defect section is detected from the storage medium of the optical driving device, the estimated servo driving signal is transmitted to a servo driver (not shown) of the optical driving device (operations 803 and 804). A servo driving signal of a current track is transmitted to the servo driver (not shown) of the optical driving device (operations 803 and 805) during a section of the storage medium other than the defect section.

Figure 9:
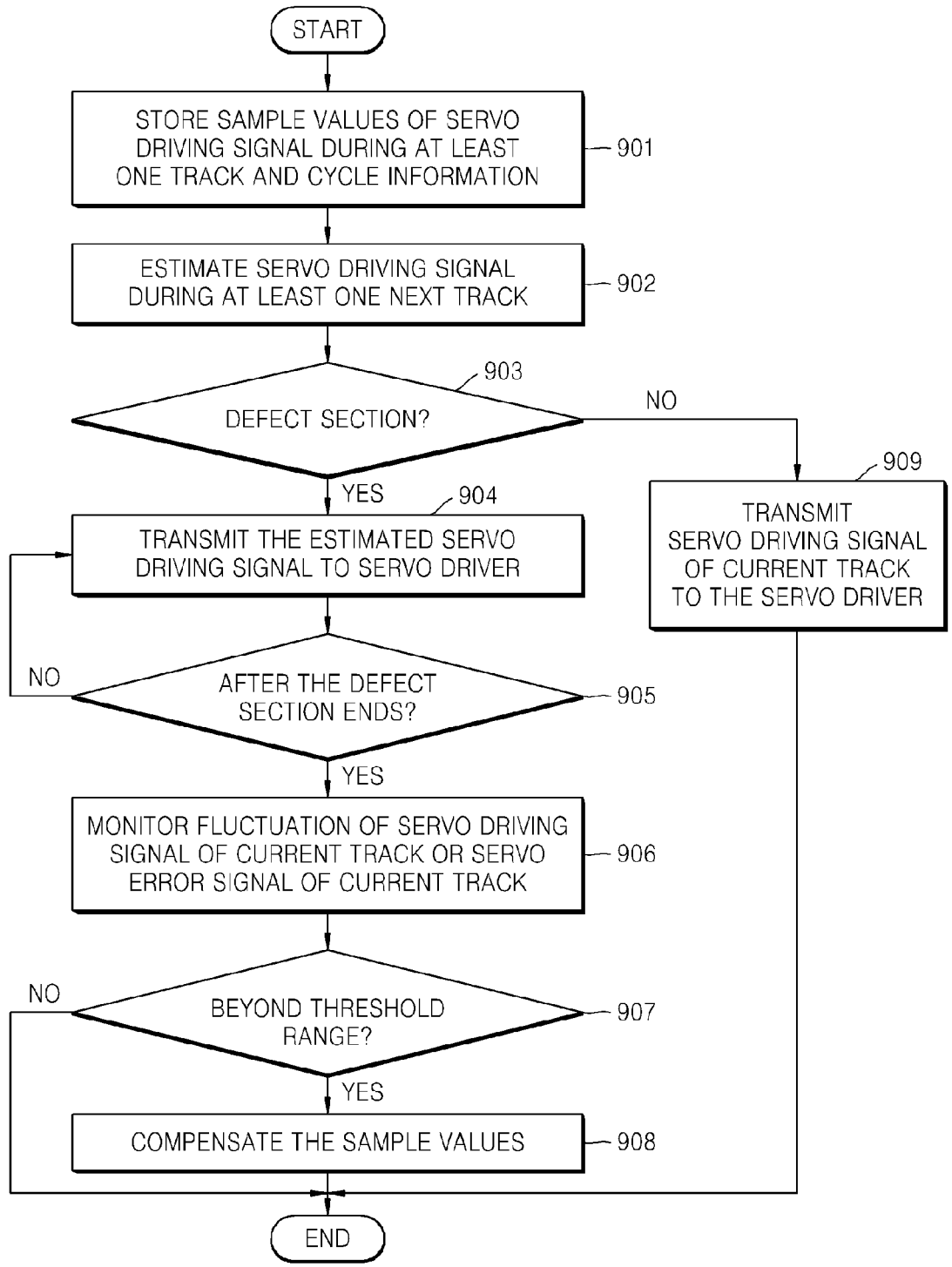
FIG. 9 is a flowchart of a method of compensating for a defect of a storage medium according to an aspect of the invention.

FIG. 9 is a flowchart of a method of compensating for a defect of a storage medium according to an aspect of the invention. The method described with reference to FIG. 9 includes an operation of the post compensator 404 described with reference to FIG. 4, in addition to the method described with reference to FIG. 8. Thus, operations 901 through 904 and 909 are the same as operations 801 through 805 described with reference to FIG. 8, and thus the descriptions thereof will not be repeated here. The remainder of the flowchart shown in FIG. 9 will now be described with reference to FIG. 4.

It is determined whether a defect section of the storage medium ends (operation 905). If it is determined that the defect section of the storage medium ends, a fluctuation of a servo driving signal of a current track or a servo error signal of the current track is monitored (operation 906). Operation 906 is the same as described with reference to FIG. 4. If it is determined that the fluctuation of the servo driving signal or the servo error signal is beyond a threshold range, sample values that are stored in the memory 404 and are adjacent to a part where the defect section ends are compensated (operations 907 and 908). Operations 907 and 908 are the same as described with reference to FIG. 4.

Aspects of the invention can also be embodied as computer-readable code on a computer-readable recording medium for controlling a processor, a special-purpose computer, or a general-purpose computer to perform a method of compensating for a defect of a storage medium of an optical driving device. A computer-readable recording medium is any data storage device that can store data which can be thereafter read by a computer system. Examples of a computer-readable recording medium include read-only memory (ROM), random-access memory (RAM), CD-ROMs, DVDs, Blu-ray Discs (BDs), magnetic tapes, floppy disks, and optical data storage devices. The computer-readable code also can be embodied in a carrier wave (such as data transmission over the Internet), or distributed over network-coupled computer systems so that the computer-readable code is stored and executed in a distributed fashion.

Although several embodiments of the invention have been shown and described, it would be appreciated by those skilled in the art that various changes may be made in these embodiments without departing from the principles and spirit of the invention, the scope of which is defined by the claims and their equivalents.

What is claimed is:

1. An apparatus for compensating for a defect of a storage medium of an optical driving device, the apparatus comprising:
    a memory to store sample values of a servo driving signal during at least one track sampled by a first signal and cycle information about the first signal;
    a servo driving signal estimator to estimate a servo driving signal during at least one next track using the sample values, the cycle information about the first signal, and cycle information based on a second signal; and
    a transmitter to transmit the servo driving signal estimated by the servo driving signal estimator to a servo driver of the optical driving device during a defect section of the storage medium;
    wherein:
        the first signal is synchronized with a radial direction of the storage medium; and
        the second signal has a frequency higher than the first signal.

2. The apparatus of claim 1, further comprising a post compensator to monitor a fluctuation of a servo driving signal of a current track or a servo error signal of the current track and compensate the sample values stored in the memory according to a result of the monitoring when the servo driving signal of the current track is transmitted to the servo driver immediately after the defect section ends.

3. The apparatus of claim 2, wherein the post compensator changes the sample values of a servo driving signal adjacent to a part where the defect section ends if the servo driving signal of the current track or the servo error signal of the current track is beyond a threshold range based on a previously established threshold during a predetermined cycle of the second signal.

4. The apparatus of claim 3, wherein the post compensator changes the sample values by a predetermined amount or by a predetermined ratio.

5. The apparatus of claim 1, wherein the servo driving signal estimator estimates the servo driving signal by performing a linear interpolation operation between the sample values using the cycle information about the first signal and the cycle information based on the second signal; and
    the cycle information about the second signal is a value obtained by counting ones of the second signal generated between successive ones of the first signal.

6. The apparatus of claim 5, wherein the servo driving signal estimator estimates the servo driving signal by performing the linear interpolation operation according to the following equation;

$$\text{Drive} = mem[N] + \frac{mem[N+1] - mem[N]}{\text{fg\_length}} \times \text{fg\_count}$$

where Drive denotes an estimated servo driving signal, mem[N] denotes an Nth sample value stored in the memory, mem[N+1] denotes an (N+1)th sample value stored in the memory, fg_length denotes the cycle information about the first signal and is cycle information between the sample values, and fg_count denotes the value obtained by counting the ones of the second signal generated between the successive ones of the first signal.

7. The apparatus of claim 6, wherein if the value obtained by counting the ones of the second signal is greater than the cycle information about the first signal stored in the memory, a maximum value obtained by counting the ones of the second signal is limited to the cycle information about the first signal.

8. The apparatus of claim 6, wherein the first signal is a frequency generator (FG) signal; and
    the second signal is a servo frequency signal.

9. The apparatus of claim 1, wherein the transmitter transmits a servo driving signal of a current track to the servo driver during a section other than the defect section of the storage medium.

10. A method of compensating for a defect of a storage medium of an optical driving device, the method comprising:
    storing sample values of a servo driving signal during at least one track sampled by a first signal and cycle information about the first signal in a memory;
    estimating a servo driving signal during at least one next track using the sample values, the cycle information about the first signal, and cycle information based on a second signal; and
    transmitting the estimated servo driving signal to a servo driver of the optical driving device during a defect section of the storage medium;
    wherein:
        the first signal is synchronized with a radial direction of the storage medium; and
        the second signal has a frequency higher than the first signal.

11. The method of claim 10, further comprising, when a servo driving signal of a current track is transmitted to the servo driver immediately after the defect section ends:
    monitoring a fluctuation of the servo driving signal of the current track or a servo error signal of the current track; and
    compensating the sample values stored in the memory according to a result of the monitoring.

12. The method of claim 11, wherein the monitoring comprises:
    determining whether the servo driving signal of the current track or the servo error signal of the current track is beyond a threshold range based on a previously established threshold; and
    if the servo driving signal of the current track or the servo error signal of the current track is beyond the threshold range, changing the sample values of a servo driving signal adjacent to a part where the defect section ends.

13. The method of claim 12, wherein the compensating comprises changing the sample values by a predetermined amount or by a predetermined ratio.

14. The method of claim 10, wherein the estimating of the servo driving signal comprises estimating the servo driving signal by performing a linear interpolation operation between the sample values using the cycle information about the first signal and the cycle information based on the second signal; and
    the cycle information about the second signal is a value obtained by counting ones of the second signal generated between successive ones of the first signal.

15. The method of claim 14, wherein the estimating of the servo driving signal comprises estimating the servo driving signal by performing the linear interpolation operation according to the following equation:

$$\text{Drive} = mem[N] + \frac{mem[N+1] - mem[N]}{fg\_length} \times fg\_count$$

where Drive denotes an estimated servo driving signal, mem[N] denotes an Nth sample value stored in the memory, mem[N+1] denotes an (N+1)th sample value stored in the memory, fg_length denotes the cycle information about the first signal and is cycle information between the sample values, and fg_count denotes the value obtained by counting the ones of the second signal generated between the successive ones of the first signal.

16. The method of claim 15, wherein if the value obtained by counting the ones of the second signal is greater than the cycle information about the first signal stored in the memory, a maximum value obtained by counting the ones of the second signal is limited to the cycle information about the first signal.

17. The method of claim 15, wherein the first signal is a frequency generator (FG) signal; and the second signal is a servo frequency signal.

18. The method of claim 10, further comprising transmitting a servo driving signal of a current track to the servo driver during a section other than the defect section of the storage medium.

* * * * *